US010197985B2

(12) United States Patent
Papenbreer et al.

(10) Patent No.: US 10,197,985 B2
(45) Date of Patent: Feb. 5, 2019

(54) SAFETY CONTROLLER MODULE

(71) Applicant: Rockwell Automation Germany GMBH & Co. KG, Wuppertal (DE)

(72) Inventors: Rudolf Papenbreer, Wuppertal (DE); Thomas Helpenstein, Grevenbroich (DE); Norbert Machuletz, Wetter (DE); Oliver Heckel, Frechen (DE); Mussa T. Khaniki, Wuppertal (DE); Bradley A. Prosak, Shaker Heights, OH (US)

(73) Assignee: Rockwell Automation Germany GMBH & Co. KG (DE)

(*) Notice: Subject to any disclaimer, the term of this patent is extended or adjusted under 35 U.S.C. 154(b) by 305 days.

(21) Appl. No.: 14/926,255

(22) Filed: Oct. 29, 2015

(65) Prior Publication Data
US 2017/0123396 A1    May 4, 2017

(51) Int. Cl.
| | | |
|---|---|---|
| *G05B 19/048* | (2006.01) | |
| *G05B 19/05* | (2006.01) | |
| *G05B 9/02* | (2006.01) | |
| *G05B 19/042* | (2006.01) | |

(52) U.S. Cl.
CPC ......... *G05B 19/048* (2013.01); *G05B 19/058* (2013.01); *G05B 9/02* (2013.01); *G05B 19/0428* (2013.01); *G05B 2219/14012* (2013.01); *G05B 2219/15078* (2013.01); *G05B 2219/21014* (2013.01); *G05B 2219/21133* (2013.01); *G05B 2219/24024* (2013.01)

(58) Field of Classification Search
CPC .................... G05B 19/048; G05B 2219/24024
See application file for complete search history.

(56) References Cited

U.S. PATENT DOCUMENTS

| | | | |
|---|---|---|---|
| 5,920,715 A | 7/1999 | Heckel et al. | |
| 2003/0208283 A1 | 11/2003 | Vasko et al. | |
| 2004/0010326 A1* | 1/2004 | Schuster | G05B 9/02 700/79 |

(Continued)

FOREIGN PATENT DOCUMENTS

| | | |
|---|---|---|
| DE | 102009054155 A1 | 5/2011 |
| EP | 1396772 A1 | 3/2004 |

(Continued)

OTHER PUBLICATIONS

SICK AG Industrial Systems, SICK Flexi Soft Modular safety Controller Hardware Operating Instruction, Dec. 5, 2014.*

(Continued)

*Primary Examiner* — Carlos R Ortiz Rodriguez
(74) *Attorney, Agent, or Firm* — Boyle Fredrickson, SC

(57) ABSTRACT

A safety controller module for providing safety control comprises a non-volatile memory configured for storing a safety control program and one or more processing units configured to execute safety control functions associated with the safety control program to provide independent safety control. The safety controller module further comprises a connector configured to communicatively couple the safety controller module with a non-safety controller. The safety controller module is configured to communicate an input and/or an output signal of the safety controller module via the connector to the non-safety controller.

17 Claims, 4 Drawing Sheets

(56) References Cited

U.S. PATENT DOCUMENTS

| | | |
|---|---|---|
| 2005/0010332 A1 | 1/2005 | Abe et al. |
| 2005/0060605 A1* | 3/2005 | Gibart ............... G05B 9/03 714/11 |
| 2006/0224811 A1 | 10/2006 | Sichner et al. |
| 2008/0179504 A1 | 7/2008 | Inoue et al. |
| 2008/0209211 A1 | 8/2008 | Grgic et al. |
| 2010/0082809 A1 | 4/2010 | Lloyd et al. |
| 2014/0075197 A1 | 3/2014 | Alrabady et al. |
| 2014/0215096 A1 | 7/2014 | Pratt |

FOREIGN PATENT DOCUMENTS

| | | |
|---|---|---|
| EP | 1517200 A1 | 3/2005 |
| EP | 2711798 A1 | 3/2014 |
| EP | 2876510 A1 | 5/2015 |
| WO | 2011/082863 A1 | 7/2011 |

OTHER PUBLICATIONS

Extended European Search Report dated Mar. 3, 2017; Application No. 16195881.4—(8) pages.
Extended European Search Report dated Aug. 25, 2016; Application No. 16161823.6—(7) pages.
Extended European Search Report dated Oct. 12, 2016; Application No. 16168141.6—(8) pages.

* cited by examiner

SAFETY CONTROLLER MODULE

BACKGROUND OF THE INVENTION

The present disclosure relates generally to industrial automation and control systems, such as those used in industrial and commercial settings. More particularly, the present disclosure relates to high reliability or industrial safety controllers appropriate for use in devices intended to protect human life and health.

Industrial controllers are special purpose computers used in controlling industrial processes. Under the direction of a stored, controlled program, an industrial controller examines a series of inputs reflecting the status of the controlled process and changes a series of outputs controlling the industrial process. The inputs and outputs may be binary, i.e. on or off, or analog, providing a value within a substantially continuous range. The inputs may be obtained from sensors attached to the controlled process and the outputs may be provided to actuators on the controlled process.

Safety systems are systems intended to ensure the safety of humans working in the environment of an industrial process. Such systems may include the electronics associated with emergency stop buttons, light curtains and other machine lockouts. Traditionally, safety systems have been implemented by a set of redundant circuits separate from the industrial control system used to control the industrial process with which the safety system is associated. Such safety systems have been hardwired from switches and relays, including specialized safety relays which provide comparison of redundant signals and internal checking of all conditions, such as welded or stuck contacts.

Safety control can be implemented in various manners, depending on the required control complexity and safety complexity, which takes into account the number of controlled zones. A safety controller can be provided in the form of a safety relay for local, small-scale and/or simple safety control, as a module for a modular, more complex configuration or as a more sophisticated but still compact programmable logic controller, fulfilling certain safety ratings. A compact safety controller can be employed within a complex safety network. Safety relays, on the other hand, are particularly useful for small scale emergency stop applications.

A traditional industrial automation system comprises both standard industrial control devices and separate safety control devices. This is particularly disadvantageous if the controllers reside within a small cabinet or enclosure where space is limited. Further, increased wiring between the components is not desirable in hazardous or rough working environments, where increased wiring or cabling between the non-safety controller and the safety controller makes the system susceptible to failure.

In another conventional approach for providing safety control to industrial automation systems, a control device with integrated safety control may be used. However, the integrated processors carry out both standard and safety tasks, which make such control devices unsuitable in particularly hazardous environments where a high safety rating is required.

It is therefore desirable to provide an improved safety controller and industrial control system as well as a method that overcomes the above disadvantages in the prior art.

BRIEF DESCRIPTION OF THE INVENTION

In one embodiment of the present disclosure, a safety controller module for providing safety control comprises a non-volatile memory configured for storing a safety control program and one or more processing units configured to execute safety control functions associated with the safety control program to provide independent safety control. The safety controller module further comprises a connector configured to communicatively couple the safety controller module with a non-safety controller, wherein the safety controller module is configured to communicate an input and/or an output signal of the safety controller module via the connector to the non-safety controller. Accordingly, a safety controller module is able to execute safety control functions and perform safety control tasks to provide safety control to a standard (non-safety) controller to which the safety controller module is coupled. The safety controller module is able to independently provide safety control, meaning that the non-safety controller cannot control the safety inputs/outputs of the safety controller module and, furthermore, the non-safety controller cannot interfere in the execution of safety control functions by the safety controller module. Thus, high-reliability safety control can be provided in a modular manner to an industrial automation system.

According to an aspect, the safety controller module is configured to receive, via the connector, and process a signal from the non-safety controller or another module communicatively coupled to the non-safety controller. The signal can be an input and/or an output of the non-safety controller. According to another aspect, the safety controller module is configured to receive, from a non-safety controller communicatively coupled to the safety controller module via the connector, a reset signal and to process the reset signal to thereby reset the safety controller module, comprising returning the safety controller module into a run state of operation, if the safety controller module upon reception of the reset signal is in a safety state of operation. According to yet another aspect, the safety controller module is configured to receive, from a non-safety controller communicatively coupled to the safety controller module via the connector, a muting signal and to process the muting signal, comprising muting a safety function of the safety controller module. Accordingly, the safety controller module is able to use feedback and signals from the non-safety controller for use in execution of safety control and/or monitoring functions.

According to an aspect, the safety controller module is configured to plug into an expansion module bay of a non-safety controller and/or a backplane coupled to a non-safety controller. Accordingly, the coupling of the safety controller module to the non-safety controller is simplified and the amount of wiring is reduced, thus increasing safety by providing failure resistance and also reducing hardware costs. According to another aspect, the safety controller module is operable for configuration and/or programming, via the connector, by means of software, wherein a safety control program resulting from a configuration and/or programming is stored in the non-volatile memory of the safety controller module. Accordingly, a configuration of the safety controller can be transferred to and from the safety controller via the connector and, according to an aspect, the non-safety controller. Further, the safety controller module may thus be used with a plurality of different non-safety controllers and expansion modules in a simple manner, as a safety control program can be configured by software in this manner as appropriate for the current modular configuration. Since, the safety controller module is interchangeable, a flexible system is provided, further reducing hardware costs for the user.

According to an aspect, the safety controller module may comprise at least two processing units operating in a partially redundant manner and a synchronization program executable by the at least two processing units, wherein the synchronization program, when executed by the at least two processing units, causes the at least two processing units to execute safety functions, to compare the execution of the safety functions and to enter a safety state when the execution differs. Accordingly, redundancy and/or high reliability i.e. increased safety is provided.

According to an aspect, the safety controller module may further comprise an additional connector configured to couple the safety controller module with a non-safety controller or a backplane, such that the safety controller module receives power via the additional connector.

In another embodiment of the present disclosure, an industrial control system comprises a non-safety controller comprising a first connector and a safety controller module configured to execute safety control functions to independently provide safety control, comprising a second connector, the safety controller module being communicatively coupled to the non-safety controller utilizing the first and second connectors. The safety controller module is configured to communicate an input and/or an output of the safety controller module via the first and second connectors to the non-safety controller. The non-safety controller is configured to execute non-safety functions based at least in part on the input and/or the output received from the safety controller module.

According to an aspect, the safety controller module is configured to receive, via the first and second connectors, and process an input signal from the non-safety controller or another module communicatively coupled to the non-safety controller.

According to an aspect, the safety controller module is configured to plug into an expansion module bay of the non-safety controller and the first connector of the non-safety controller comprises a bay connector of an expansion module bay, or the safety controller module is configured to communicatively couple to a backplane of the non-safety controller and the first connector of the non-safety controller comprises a backplane connector coupled to a backplane of the non-safety controller.

According to another aspect, the industrial control system further comprises a backplane, wherein the non-safety controller module and the safety controller are configured to communicatively couple to the backplane via the first and second connectors, respectively, such that the safety controller module and the non-safety controller communicate with each other via the backplane.

According to a further aspect, the industrial control system further comprises a reset switch or a reset button communicatively coupled to an input terminal of the non-safety controller and configured to provide a reset signal and/or a muting signal generating device communicatively coupled to an input terminal of the non-safety controller, the muting signal device comprising a muting sensor and/or a muting switch and being configured to provide a muting input signal to mute a safety function of the industrial safety controller. The non-safety controller is configured to provide the reset signal and/or the muting signal to the safety controller module via the first and second connectors. According to another aspect, the non-safety controller is configured to control outputs associated with non-safety functions only.

According to a further aspect, the safety controller module has a color that is different from the non-safety controller and/or other modules. Accordingly, the safety controller module can be easily distinguished from the non-safety controller and other non-safety modules and/or devices, for increased safety.

In yet another embodiment of the present disclosure, a method of providing safety control by a safety controller module comprises a step of communicatively coupling, utilizing a first connector of a non-safety controller module and a second connector of a safety controller, a non-safety controller module with a safety controller. The safety controller module subsequently executes safety control functions to provide independent safety control. The safety controller module communicates an input and/or an output of the safety controller module through the first and second connectors to the non-safety controller.

According to an aspect, the method further comprises the steps of receiving at the safety controller, via the first and second connectors, and processing a signal from the non-safety controller or another module communicatively coupled to the non-safety controller. According to an aspect, the signal may comprise a reset signal, the processing comprising resetting the safety controller module. According to another aspect, the input signal may comprise a muting signal, the processing comprising muting a safety function of the safety controller module.

According to another aspect, the step of communicatively coupling further comprises communicatively coupling the non-safety controller module and the safety controller to a backplane via the first and second connectors, respectively, such that the safety controller module and the non-safety controller communicate with each other via the backplane.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
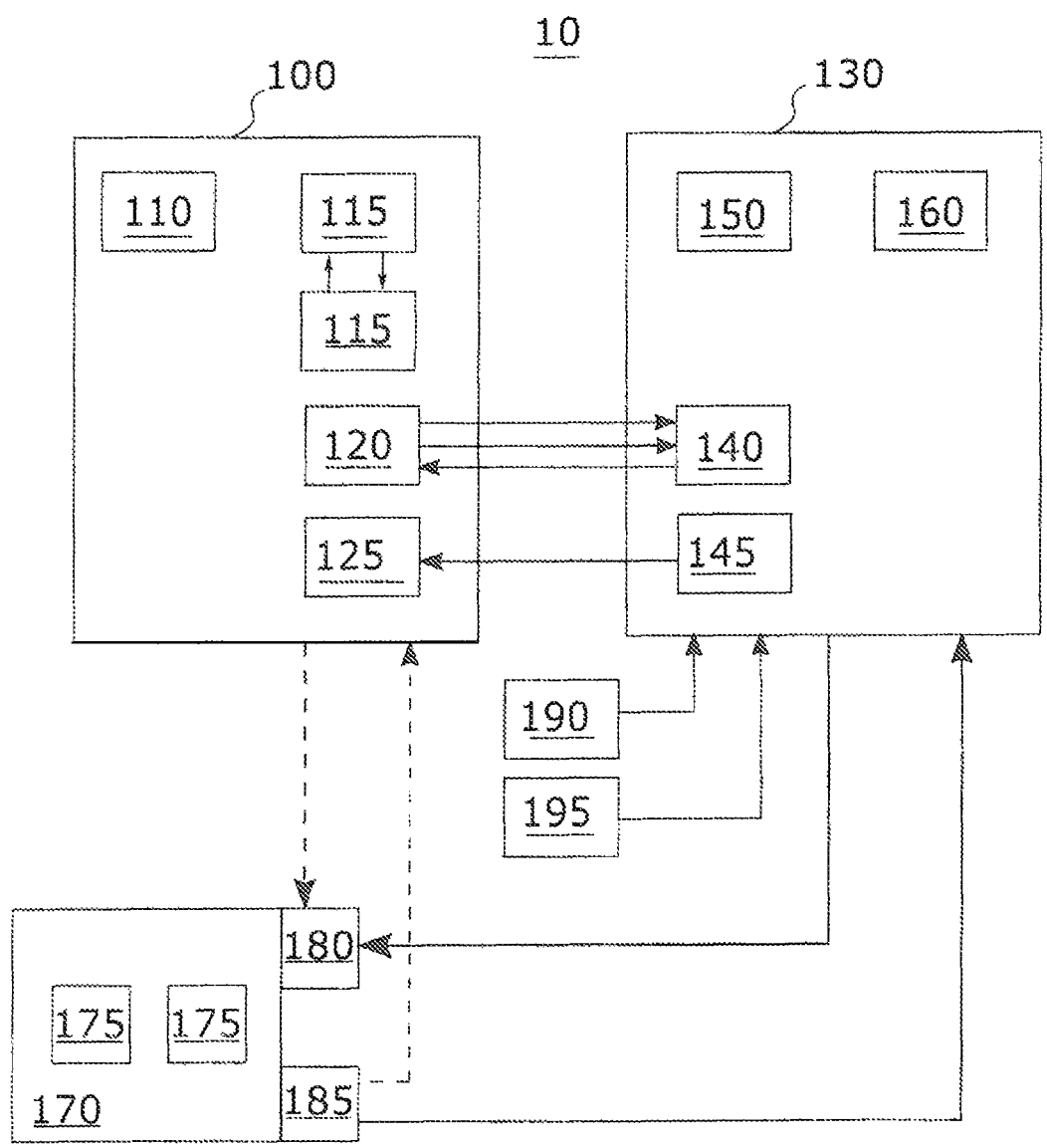
FIG. 1 illustrates a block diagram of an industrial control system in accordance with an embodiment.

In describing the various embodiments of the invention which are illustrated in the drawings, specific terminology will be resorted to for the sake of clarity.However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

While the present disclosure may be susceptible to various modifications and alternative forms, specific embodiments are shown by way of example in the drawings and are described in detail herein. However, it should be understood that the embodiments are not intended to be limited to the particular forms disclosed. Rather, the disclosure is to cover all modifications, equivalents and alternatives falling within the scope of the disclosure as defined by the appended claims. Further, although individual embodiments are discussed here in a simplified explanation, the disclosure is intended to cover all combinations of these embodiments.

Figure 2:
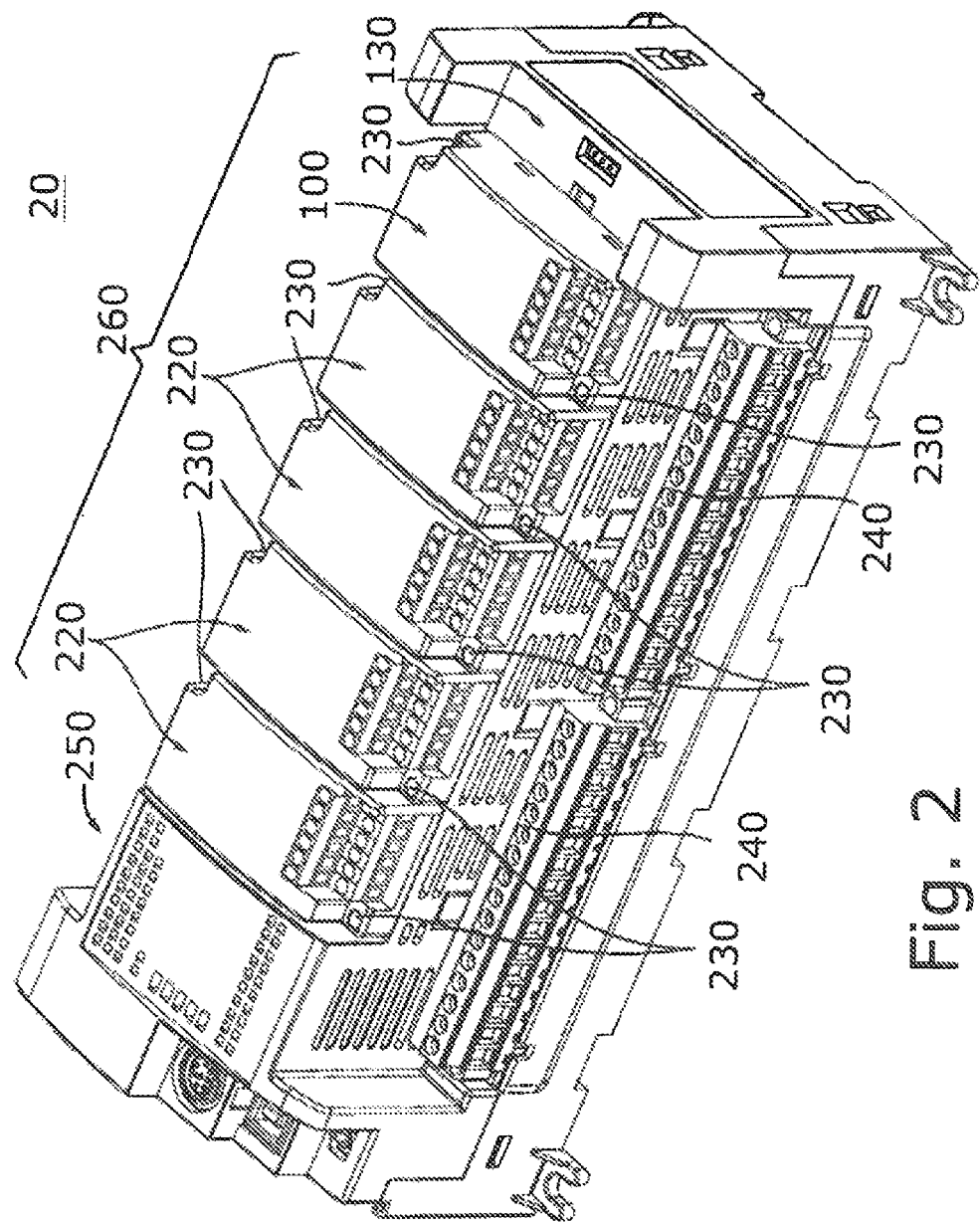
FIG. 2 illustrates a perspective view of an industrial control system in accordance with an embodiment.

Specifically, details, elements and specific aspects disclosed with respect to safety controller modules and industrial control systems according to embodiments illustrated in relation to FIGS. 1 and 2 according to the present disclosure are combinable, where not obviously contradictory or defined as relating to strict alternatives. Steps and elements thereof of the method described in relation to FIG. 4 may be combined in a parallel or sequential execution. Further, while methods are described with respect to FIG. 4, details and elements described with respect to FIGS. 1, 2 and 3 in embodiments embraced by the present disclosure are combinable with the method steps described in relation to FIG. 4.

In the following description of embodiments of the present disclosure, the term "safety controller module" is to be understood as comprising the meaning of a safety relay, which is a kind of small scale industrial safety controller. Further, where in the following the term "non-safety controller" is used, this term is to be understood as synonymous with standard industrial automation controller configured to execute a non-safety related control program to carry out non-safety related tasks and/or functions. A non-safety controller may be a standard programmable logic controller. Further, input and/or output signals may, where not explicitly defined otherwise, be digital and/or analog.

According to embodiments of the present disclosure, an industrial control system comprises a safety controller module and a standard (or non-safety) controller. More specifically, the safety controller module is configured to execute safety control functions associated with a safety control program. By communicatively coupling the safety controller module to the non-safety controller (for example, by plugging the safety controller module into the non-safety controller or by plugging both the safety controller module and the non-safety controller into a backplane), information relating to an industrial automation system or process may be exchanged. The safety controller module may receive feedback and/or other input for processing within a safety control program. The safety controller module may output diagnostic information to the non-safety controller as input signals for processing within a non-safety control program. Further, the safety controller module may provide safety outputs as additional information to the non-safety controller.

Although the safety controller module and the non-safety controller exchange information, the safety controller module executes the safety control program independently of the non-safety controller or any other modules or devices communicatively coupled to the safety controller module. The safety controller module or its output cannot be controlled by the non-safety controller, nor can the non-safety controller interrupt safety control functions or tasks of the safety controller module even though information is exchanged. In other words, the safety controller module is configured to prohibit a non-safety controller or any other non-safety I/O module communicatively coupled to the safety controller module, either directly or via the non-safety controller, access to safety tasks and/or safety functions. Accordingly, the safety controller module provides safety functions to a standard controller based on the fact that it has limited I/O.

It is advantageous to be able to plug-in or otherwise couple a safety controller module to a non-safety controller. This facilitates assembly of the system and reduces the amount of wiring and space required. Furthermore, by keeping the standard (non-safety) tasks of the standard (non-safety) industrial controller and the safety tasks of the safety controller module separate, the reliability and safety of the system is increased.

Turning now to the drawings and referring first to FIG. 1, an exemplary industrial control system 10 comprising a safety controller module 100 and a non-safety controller 130 is illustrated. The system 10 may be housed in an enclosure, such as an electrical cabinet, in which electric components, such as monitoring and/or control components are housed. The non-safety controller 130 can be mounted to a rail utilizing rail mounting latches.

The non-safety controller 130 may be a standard industrial-automation controller adapted to interface with components 175 of a machine, system or process 170. The process 170 may comprise a variety of operational components 175, such as electric motors, valves, actuators, temperature elements, and pressure sensors, for a myriad of manufacturing, processing, material handling, and other applications. Further, the process 170 may comprise control and monitoring equipment, such as actuators 180 and sensors 185, for regulating process variables through automation and/or observation. The actuators 180 may include any number of devices adapted to perform a mechanical action in response to a signal from the non-safety controller 130. The sensors 185 may comprise any number of devices adapted to detect process conditions and provide signals to the non-safety controller 130 indicative of the detected conditions. The non-safety controller 130 may comprise a non-volatile memory 150 for storing a non-safety control program and one or more processors 160 configured to execute non-safety control functions associated with the non-safety control program. Thus, the non-safety controller 130 may receive input signals from the sensors 185 and other components 175 of a machine or process 170 and provide output signals to the actuators 180 and other components 175 of the machine or process 170 in order to control the industrial process 170. According to embodiments, the non-safety controller 130 comprises a connector 140 configured to communicatively couple the non-safety controller 130 with the safety controller module 100.

The safety controller module 100 is a programmable control module that is programmed and/or configured to perform safety control operations. The safety controller module 100 comprises a non-volatile memory 110, which may comprise writable non-volatile memory and, optionally, read-only memory (ROM), for storing one or more safety control programs. The safety controller module 100, according to embodiments, comprises a connector (or module connector) 120 configured to communicatively couple the safety controller module 100 to the non-safety controller 130. The module connector 120 and the connector 140 of the non-safety controller may be configured to communicatively couple to each other either directly or via a backplane.

The safety controller module 100 may be operable for configuration and/or programming via the connector 120 of the safety controller module 100, by means of software, wherein a safety control program resulting from a configuration and/or programming is stored in the non-volatile memory 110 of the safety controller module 100. According to embodiments, the safety controller module 100 is configurable via software running on a remote device (not shown). According to embodiments, the configuration and/or programming may be performed via a non-safety controller 130 communicatively coupled to the safety controller module 100. According to another embodiment, the configuration and/or programming may be performed via another controller, module or device communicatively coupled to the safety controller module 100. According to embodiments, configuration and/or programming of the safety controller module may be carried out only upon installation/initialization of the safety controller module in the non-safety controller module. According to another embodiment, limited configuration may be possible during operation of the safety controller module.

The safety controller module 100 is configured to receive signals, such as feedback and/or monitoring information related to parameters of the industrial process 170 and/or safety-related signals. Parameters of the industrial process 170 may include, but are not restricted to, vibration, temperature or pressure data. According to embodiments, the signals may be received from the non-safety controller 130 and/or from another device or component via the non-safety controller 130. According to another embodiment, the input signals may be received directly from other devices or components communicatively coupled to the safety controller module 100. According to an embodiment, a signal from a non-safety controller 130, other module or device may be provided to the safety controller module 100 over two channels, wherein the safety controller module 100 may be configured to compare the signals and, in the case of a match within a predefined time window, the signal can be determined as valid within a safety rating. Thus, a signal from a non-safety component of the industrial automation system 170 may be provided to the safety controller module 100 in a safe manner.

The safety controller module 100 is configured to execute a safety control program stored on the non-volatile memory 110 to process said signals. According to embodiments, the safety controller module 100 comprises one or more processing units 115. The one or more processing units 115 are configured to execute safety control functions associated with the safety control program stored on the non-volatile memory 100. In an embodiment, the received signals are processed according to a predefined safety logic, wherein the safety logic is predefined during configuration/parameter setting as discussed above. The safety controller module 100 is configured to communicate an input and/or an output signal of the safety controller module 100 via the module connector 120 and the connector 140, respectively, to the non-safety controller 130. In an embodiment, the safety controller module may be configured to accept two single-wire safety inputs and to provide two single-wire safety outputs. This allows the safety controller module to be an integral part of an extensive machine guarding safety system.

According to one embodiment, the safety controller module 100 is configured to monitor feedback data associated with parameters of the industrial process 170 and to provide an input signal of the safety controller module 100 to the non-safety controller 130. The input signal of the safety controller module 100 is configured to be used by the non-safety controller module 130 to perform non-safety control tasks. For example, the input signal of the safety controller module 100 may comprise diagnostic information generated by the safety controller module 100. According to another embodiment, the safety controller module 100 is configured to monitor feedback data associated with parameters of the industrial process 170 and to generate a safety output if the value of the parameters is above and/or below a predetermined threshold or outside of a certain predetermined range. In an embodiment, a safety output may comprise an internal safety output to switch off adjacent output expansions safely.

According to a further embodiment, the signals received by the safety controller module 100 may comprise safety input signals from an emergency stop button or other machine lockout, a light curtain, a safety mat, and/or another safety component. The signals may be received via the non-safety controller module or directly from safety components communicatively coupled to the safety controller module, e.g. by input terminals of the safety controller module.

According to an embodiment, the safety controller module 100 may be configured to receive a reset and/or a muting signal. The industrial control system 10 may further comprise a reset switch or a reset button 190, configured to provide a reset input signal to an input terminal of a non-safety controller 130. Upon receipt of the reset input signal via the non-safety controller 130, the safety controller module 100 processes the reset input signal and, as a consequence, resets the safety controller module 100, comprising returning the safety controller module 100 into a run state of operation, if the safety controller module 100 upon reception of the reset signal is in a safety state of operation. If the safety controller module 100 was in the safety state of operation, such that actuators 180 are controlled by output signals provided by the safety controller module 100 such that hazards to human life or health are obviated, meaning that a machine is shut off or a conveyor belt is stopped, resetting the safety controller module 100 changes the output signals provided to the actuators 180 such that the non-safety controller 130 returns the actuator components 180 into a run state of operation, provided that processing of the inputs of the safety control program indicates a safe operation of the industrial process 170. Simply put, the safety controller module 100 returns to a run state of operation upon resetting.

According to an embodiment, the industrial control system 10 further comprises a muting signal generating device 195 which may be at least one of a muting sensor and a muting switch. The safety controller module 100, upon receipt of a muting signal received from the muting generating device 195, via an input terminal of a non-safety controller 130, processes the muting signal and, as a result thereof, mutes a safety function of the safety controller module 100. The muting according to embodiments is restricted to a limited period of time and according to present embodiments can be provided via non-safe input channels.

According to an embodiment, redundancy and/or increased reliability of the safety controller module 100 can be provided by having at least two processing units 115 operating in an at least partially redundant manner. The at least two processing units 115 may execute a synchronization program, wherein input signals are synchronized between the two processing units, each processing unit 115 subsequently performing safety tasks of a safety control program utilizing said synchronized inputs. Finally, outputs of the safety control programs are compared before each output is provided to an output terminal of the safety controller module 100. If the outputs do not match, the safety controller module 100 enters a safety state of operation.

According to a further embodiment, the safety controller module comprises a second connector 125, configured to couple the safety controller module 100 with the non-safety controller 130 or a backplane (not shown), such that the safety controller module 100 receives power from the non-safety controller 100. The second connector 125 of the safety controller module 100 may be configured to couple to a second connector 145 of the non-safety controller.

Turning now to FIG. 2, a perspective view of an exemplary industrial control system 20 with a safety controller module 100 and a non-safety controller 130 is illustrated. The safety controller module 100 is illustrated as being coupled to (e.g., plugged into) the non-safety controller 130. According to embodiments, the safety controller module 100 may be configured to plug into the top outer-facing surface of the non-safety controller 130. According to embodiments, the non-safety controller 130 may comprise one or more slots or connectors to couple to one or more modules. FIG. 2 illustrates four other modules 220 coupled to the non-safety controller 130. However, the present disclosure is not restricted to this configuration and, according to embodiments, only the safety controller module 100 may be coupled to the non-safety controller 130. According to embodiments, the safety controller module 100 and one or more other modules 220 may be coupled to the non-safety controller 130. The other modules 220 may provide various different system functions and configurations. The other modules 220 may be configured to transfer input and output signals between the non-safety controller 130 and features associated with the controlled process. The other modules 220 may also include programmable control modules configured to provide control functionality. In an embodiment, the safety controller module 100 may have a color that is different from the non-safety controller 130 and/or the other modules 220. The housing of the safety controller module 100 may be colored red, whereas the housing of the non-safety controller 130 and/or the other modules 220 may be colored gray. The red color signifies the safety device rating and provides a visual distinction that indicates the safety controller module 100 performs a safety control function, as opposed to the gray colored standard (non-safety) controllers, modules and devices.

In an embodiment, the non-safety controller 130 comprises an interlocking system for connecting modules such as the safety controller module 100. More specifically, an expansion module bay 260 of the non-safety controller 130 includes one or more slots to host modules, in particular plug-in modules such as the safety controller module 100 and other modules 220. Each slot comprises a bay connector for providing at least communicative coupling with a plug-in module such as the safety controller module 100. The bay connectors of the module bay 260 include interface slots and/or receptacles, and communication ports configured to receive one or more corresponding coupling features or communication features of the safety controller module 100. For example, the modules include receptacles and screws 230 that are configured to engage with receptacles of the module bay 260. Thus, the modules and the non-safety controller 130 can be coupled together. In an embodiment, the safety controller module 100 can be plugged into the module bay 260 utilizing plug-in latches. According to an embodiment, the safety controller module 100 and the non-safety controller module 130 may communicate via a serial peripheral interface. Additionally, according to an embodiment, power may be supplied from the non-safety controller 130 to the plug-in modules 100 and 220 via the module bay connector.

In an embodiment, the non-safety controller 130 may also include a display, such as an LCD or other display, configured to display parameters, such as operating parameters of the process, temperatures or pressures sensed by the sensors, position information of the actuators, and so forth. In an embodiment, the displayed parameters may be based at least in part on diagnostic information received from the safety controller module. In some embodiments, the non-safety controller 130 also includes various indicators 250 (e.g., light emitting diodes) that provide status indications for the non-safety controller 130 and/or modules coupled with the non-safety controller 130. In yet another embodiment, the safety controller module 100 may include various indicators (e.g., light emitting diodes) that provide status indications for the safety controller module 100. The status indicators of the non-safety controller 130 and/or the safety controller module 100 may show at least one of input status, power status, run status, fault status, lock status, serial communications status and output status.

According to an embodiment, the non-safety controller 130 includes integral terminal blocks 240. These terminal blocks 240 may be utilized to provide input signals to and output signals from the non-safety controller 130 and/or attached modules 100 and/or 220.

According to a related embodiment, the safety controller module 100 and/or the other modules 220 may be configured to couple to the side of the non-safety controller 130. For example, the modules may be configured to plug into the side of the non-safety controller 130. The modules may be configured to plug into removable terminal blocks, which are configured to plug into the side of the non-safety controller 130 and each other. According to embodiments, the safety controller module 100 may be configured to couple to a backplane connector of the non-safety controller, for example via the terminal blocks. The safety controller module may be configured to receive signals from the non-safety controller 130 and/or other modules 220 via the backplane. According to a further embodiment, the safety controller module 100 may be configured/programmed via the backplane. The safety controller may he configurable with simple logic functions, such as AND/OR between controller, modules and cascaded devices. The safety controller module may be configured to output signals to the non-safety controller 130 and/or other modules 220 via the backplane.

Referring partially to elements of FIG. 1, the safety controller module 100 may comprise a second connector 125 configured to couple with the non-safety controller 130, so that the safety controller module 100 receives power from the bus of the non-safety controller 130 via the backplane. The other modules 220 may also be configured to receive power via the backplane.

According to an embodiment, the safety controller module 100 may he configured to shut down backplane power supply. For example, the safety controller module 100 may be configured to shut down power to all modules to one side of the safety controller module 100. In an embodiment, a safety output signal of the safety controller module 130 may comprise an internal safety output to switch off adjacent expansion modules safely.

Figure 3:
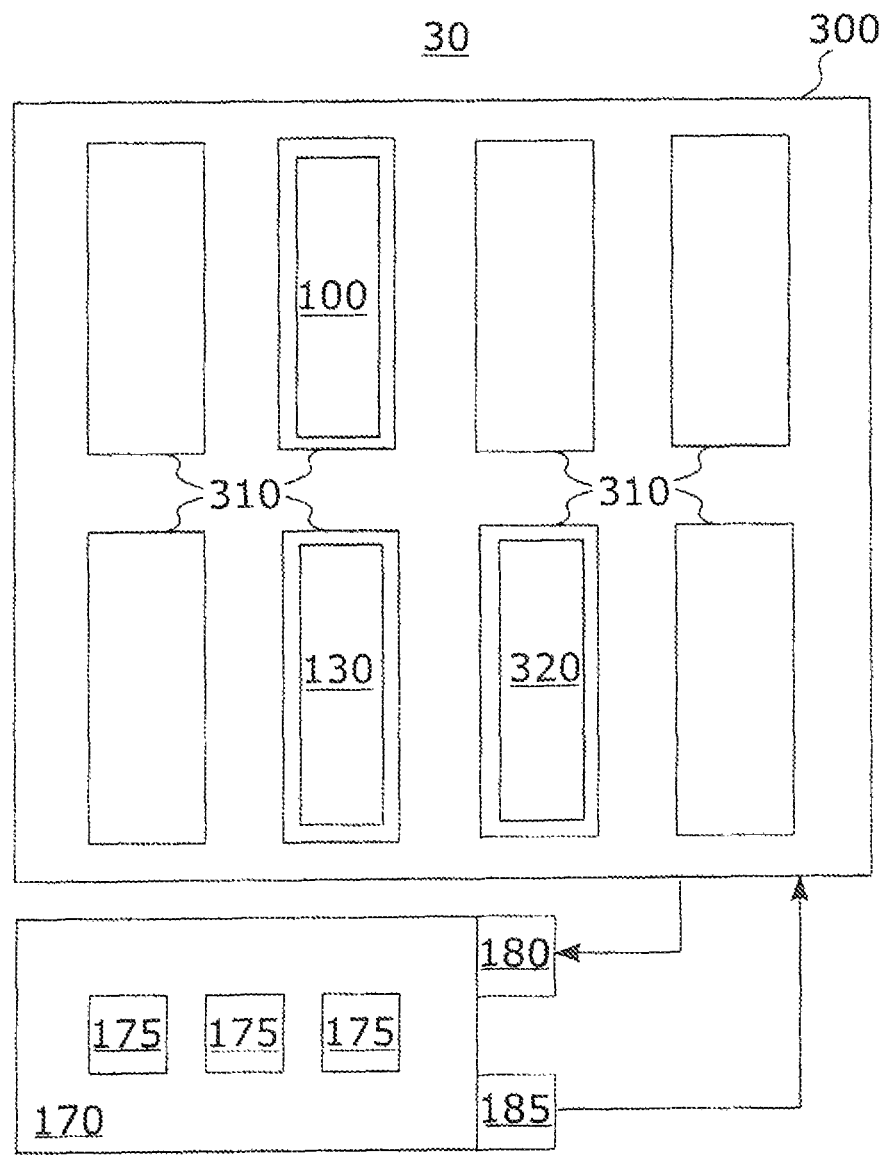
FIG. 3 illustrates a block diagram of an industrial control system in accordance with an embodiment.

Turning now to FIG. 3, a block diagram of an industrial control system 30 comprising a safety controller module 100, a non-safety controller 130 and a backplane 300 is illustrated. In an embodiment, the safety controller module 100 and the non-safety controller 130 comprise a backplane connector configured to couple certain features of the safety controller module 100 and the non-safety controller 130 to a backplane 300 that provides for distribution of power and data signals. Such backplanes are currently in use throughout industrial applications to provide data and control signals to and from automation controllers, computer components and peripherals and so forth. The backplane may be mounted to a rail by a rail latch mechanism. The backplane 300 may comprise two or more connectors 310 configured to couple to the safety controller module 100, the non-safety controller 130 and/or other modules 320. In an embodiment, the safety controller module 100 and the non-safety controller 130 may be configured to couple to (e.g., plug into) the backplane 300. The safety controller module 100, the non-safety controller 130 and other modules may be connected to the backplane by a latch mechanism. The backplane may be communicatively coupled to the industrial process 170, actuators 180 and/or sensors 185, and the non-safety controller 130 and/or the safety controller module 100 may be communicatively coupled to the industrial process 170, actuators 180 and/or sensors 185 via the backplane.

According to embodiments, and partially also referring to elements of FIG. 1, the safety controller module 100 and the non-safety controller 130 may be configured to receive input signals and output signals via the backplane 300. More specifically, the safety controller module 100 may be configured to receive, via the module connector 120, input signals over the backplane 300. The safety controller 100 module may be configured to output, via the module connector 120, output signals to the non-safety controller 130 over the backplane 300. The safety controller module 100 may be further configured to receive, via the second connector 125, power over the backplane 300. The non-safety controller 130 may be configured to receive input signals and output signals, via the connector 140, over the backplane 300. The non-safety controller 130 may be further configured to receive power over the backplane 300. In an embodiment, the exchange of signals between the safety controller module 100, the non-safety controller 130 and/or the other modules 320 may be performed over Ethernet/IP.

In an embodiment, the safety controller module 100 may provide, via the connector 120, output signals to other controllers and/or modules 320 communicatively coupled to the backplane 300. The safety controller module 100 may be configured to perform at least two safety monitoring functions for each other module 320. Additionally, the safety controller module 100 may be configured to perform safety control for zone control and to provide a global emergency stop function. For example, the safety controller module 100 may be configured to provide a safety control output, such as an emergency stop as information to all controllers/modules coupled to the backplane 300. As an example, one of said controllers or modules could use said emergency stop signal to generate an output for providing an additional indicator signal, such as a warning light or a warning sound, in addition to the immediate shutdown effected by the safety controller module 100.

Figure 4:
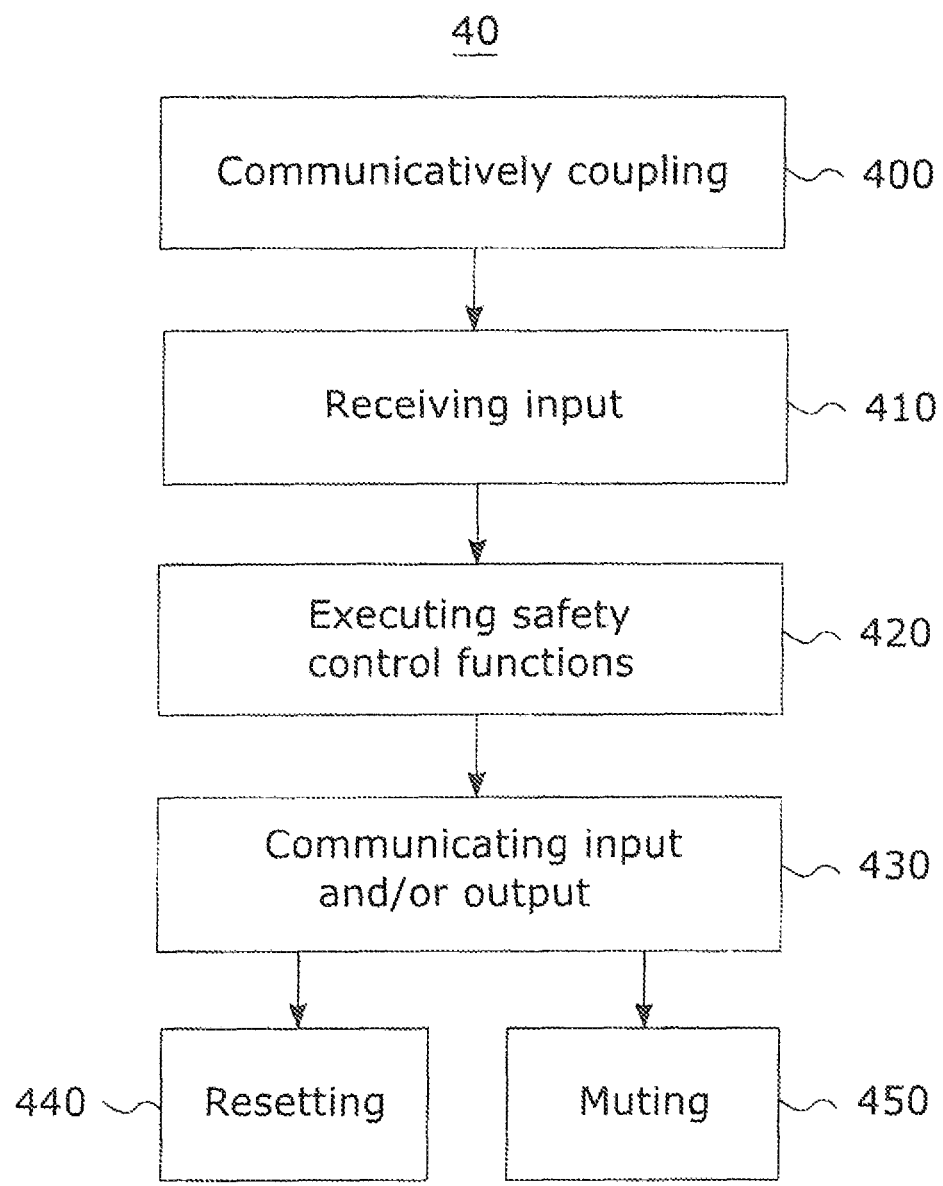
FIG. 4 illustrates a process flow diagram for a method of providing safety control by a safety controller module in accordance with an embodiment.

Turning now to FIG. 4, an exemplary method 40 of providing safety control by a safety controller module is illustrated. At step 400, a safety controller module 100 is communicatively coupled with a non-safety controller 130, utilizing a module connector of the safety controller module and connector of a non-safety controller. According to an embodiment, the communicative coupling is accomplished using a bay connector of an expansion module bay or a backplane connector of a backplane of the non-safety controller. According to another embodiment, the communicative coupling may be accomplished by coupling the safety controller module and the non-safety controller to a backplane, such that the safety controller module and the non-safety controller communicate with each other via the backplane.

At step 410, the safety controller module 100 receives and processes an input signal from the controlled process 170. According to an embodiment, the input signal is received from a non-safety controller or another module communicatively coupled to the non-safety controller via the connector and the module connector, respectively. According to embodiments, the safety controller module may also receive input signals from other modules or components directly. The input signal is processed by the one or more processing units 115 of the safety controller module 100 within a safety function or safety task of the safety controller module. This means that while the input signal can be received by a non-safe input channel, according to present embodiments, the safety controller module can process the received input signal within the safety function or safety task of the safety controller module.

At step 420, the safety controller module 100 executes safety control functions to provide independent safety control. This may include performing safety-related tasks such as monitoring parameters of an industrial process controlled by the non-safety controller and outputting safety-related signals and/or diagnostic information.

At step 430, the safety controller module 100 communicates an input and/or an output of the safety controller module through the module connector and the connector to the non-safety controller. The non-safety controller 130 may use the input for execution of non-safety control functions. The output may comprise an emergency stop signal provided as information to components of an industrial control system via the non-safety controller.

According to embodiments, the method can further comprise the step 440 of resetting the safety controller module 100 in response to an input signal comprising a reset signal. According to further embodiments, the method can further comprise the step 450 of muting a safety function of the safety controller module 100 in response to receiving a mute signal as the input signal. Accordingly, non-safe devices can be used according to present embodiments to provide signals to a safety controller module via non-safe input/output modules and/or terminals. The safety controller module 100 executes the safety control program stored within the safety controller module 100 to determine whether the components 175 of the process 170 connected to the safety controller module 100 are in a safe state to permit the reset and/or muting of the safety function executed by the safety controller module 100 and, if so, permits the reset or muting to execute in response to the corresponding command signal from the non-safety controller 130.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A safety controller module for providing safety control, comprising:
   a first housing operative to be physically mounted to one of an expansion module bay and a slot in a second housing, wherein the second housing includes a non-safety controller:
   a non-volatile memory configured for storing a safety control program;
   one or more processing units configured to execute safety control functions associated with the safety control program to provide safety control independent of the non-safety controller; and
   a first connector accessible via an opening in the first housing and operative to engage a second connector accessible via an opening in the second housing on the non-safety controller, wherein:
   the second connector is one of a bay connector in the expansion module bay and a backplane connector for the non-safety controller accessible when the first housing is inserted in the slot in the second housing;
   when the first connector engages the second connector, the safety controller module is communicatively coupled to non-safety controller, the safety controller module is configured to communicate at least one of an input and an output signal of the safety controller module via the first connector to the second connector of the non-safety controller,
   at least one signal from the non-safety controller is received at the safety controller via the first and second connectors,
   the at least one signal includes one of feedback and monitoring information related to a process controlled by the non-safety controller,
   the at least one signal is provided to the non-safety controller from a device in the controlled process, and
   the one or more processing units execute the safety control program as a function of the at least one signal from the non-safety controller.

2. The safety controller module of claim 1, configured to receive a reset signal from the non-safety controller communicatively coupled to the safety controller module via the first and second connectors and to process the reset signal to thereby reset the safety controller module, comprising returning the safety controller module into a run state of operation, if the safety controller module upon reception of the reset signal is in a safety state of operation.

3. The safety controller module of claim 1, configured to receive a muting signal from the non-safety controller communicatively coupled to the safety controller module via the first and second connectors and to process the muting signal, comprising muting a safety function of the safety controller module.

4. The safety controller module of claim 1, operable for at least one of configuration and programming, via the first and second connectors, by means of software, wherein the safety control program resulting from the at least one of configuration and programming is stored in the non-volatile memory of the safety controller module.

5. The safety controller module of claim 1, comprising at least two processing units operating in a partially redundant manner and a synchronization program executable by the at least two processing units, wherein the synchronization program, when executed by the at least two processing units, causes the at least two processing units to execute safety functions, to compare the execution of the safety functions, and to enter a safety state when the execution differs.

6. The safety controller module of claim 1, comprising an additional connector configured to couple the safety controller module with at least one of the non-safety controller or a backplane, such that the safety controller module receives power via the additional connector.

7. The safety controller of claim 1 wherein the at least one signal from the non-safety controller is received over two channels on the first and second connectors.

8. An industrial control system, comprising:
   a non-safety controller comprising a first housing and a first connector accessible via an opening in the first housing; and
   a safety controller module, configured to execute at least one safety control function to provide safety control independently from the non-safety controller, comprising a second housing operative to be removably connected to the first housing and a second connector accessible via an opening in the second housing, the safety controller module being communicatively coupled to the non-safety controller utilizing the first and second connectors when the second housing is plugged in to the first housing, wherein:
   the first connector is one of a bay connector in an expansion module bay on the first housing and a backplane connector for the non-safety controller accessible via a slot in the first housing when the second housing is inserted in the slot in the first housing;
   the safety controller module is configured to communicate at least one of an input and an output of the safety controller module via the first and second connectors to the non-safety controller,
   the safety controller module is configured to receive, via the first and second connectors, and process at least one signal from at least one of the non-safety controller and another module communicatively coupled to the non-safety controller,
   the at least one signal includes one of feedback and monitoring information related to a process controlled by the non-safety controller,
   the at least one signal is provided to the non-safety controller from a device in the controlled process,
   the safety controller module executes the at least one safety control function as a function of the at least one signal from the non-safety controller, and
   wherein the non-safety controller is configured to execute non-safety functions based at least in part on at least one of the input and the output received from the safety controller module.

9. The system of claim 8, further comprising at least one of a reset switch and a muting signal generating device, wherein:
   the reset switch is communicatively coupled to an input terminal of the non-safety controller and configured to provide a reset signal,
   the muting signal generating device is communicatively coupled to an input terminal of the non-safety controller, the muting signal device comprising at least one of a muting sensor and a muting switch and being configured to provide a muting input signal to mute a safety function of the industrial safety controller, and the non-safety controller is configured to provide at least one of the reset signal and the muting signal to the safety controller module via the first and second connectors.

10. The system of claim 8, wherein the non-safety controller is configured to control outputs associated with non-safety functions only.

11. The system of claim 8, wherein the safety controller module has a color that is different from the non-safety controller.

12. The industrial control system of claim 8 wherein the at least one signal from the non-safety controller is received over two channels on the first and second connectors.

13. A method of providing safety control by a safety controller module, comprising:
   mounting the safety controller module to a non-safety controller via one of an expansion module bay and a slot in a housing of the non-safety controller;
   communicatively coupling the non-safety controller module with the safety controller utilizing a first connector of the non-safety controller module and a second connector of the safety controller;
   receiving at the safety controller, via the first and second connectors, and processing at least one signal from at least one of the non-safety controller and another module communicatively coupled to the non-safety controller;
   the at least one signal includes one of feedback and monitoring information related to a process controlled by the non-safety controller,
   the at least one signal is provided to the non-safety controller from a device in the controlled process,
   executing, by the safety controller module, safety control functions to provide independent safety control as a function of the at least one signal from the non-safety controller; and
   communicating, by the safety controller module, at least one of an input and an output of the safety controller module through the first and second connectors to the non-safety controller.

14. The method of claim 13 the at least one signal comprising a reset signal, the executing, by the safety controller module, comprising resetting the safety controller module.

15. The method of claim 13, the at least one signal comprising a mute signal, the executing, by the safety controller module, comprising muting a safety function of the safety controller module.

16. The method of claim 13, wherein the communicatively coupling comprises communicatively coupling the non-safety controller module and the safety controller to a backplane via the first and second connectors, respectively, such that the non-safety controller module and the safety controller communicate with each other via the backplane.

17. The method of claim 13 wherein the at least one signal from the non-safety controller is received via two channels over the first and second connectors.

\* \* \* \* \*